Patented May 30, 1933

1,911,722

UNITED STATES PATENT OFFICE

BEN E. SORENSON, OF WILMINGTON, DELAWARE, ASSIGNOR TO E. I. DU PONT DE NEMOURS & COMPANY, OF WILMINGTON, DELAWARE, A CORPORATION OF DELAWARE

POLYMERIZATION OF FURYLETHYLENE

No Drawing.   Application filed January 23, 1929. Serial No. 334,600.

This invention relates to the art of coating compositions and, more particularly, to the production of new synthetic resins and coating compositions made therefrom.

I have discovered that if furylethylene is polymerized by heat or ultra-violet light it forms a resinous material which is soluble in the ordinary lacquer and varnish solvents, and may be used to form coating compositions which will dry quickly to form hard coatings that have good water resistance.

It is therefore an object of this invention to provide a new method of making synthetic resins.

It is another object of this invention to provide new synthetic resins.

It is a further object of this invention to provide new and improved coating compositions.

With the above and other objects in view, which will be apparent as the description proceeds, I have set forth my invention in the following specification and have included the following examples by way of illustration and not as a limitation.

Example 1

10 parts by weight of furylethylene and 0.1 part by weight of benzoyl peroxide were heated in a pressure tube for 6 hours at 180–190° C. A light red syrup was obtained. A 50% solution of this syrup in toluol had a viscosity of A (Gardner-Holdt standard). Films from this solution dried tack free in 8 hours and hard in 24 hours.

Example 2

10 parts by weight of crude furylethylene containing furylacrylic acid was heated at 180–190° C. for 3 hours in a pressure tube. Films from the solution made up as in Example 1 showed tendencies to frost when a heavy coat was applied, on account of the low degree of polymerization which had taken place in this short period of heating, but this frosting was avoided when thin coats were used or when one part by weight of resin was mixed with 3 parts by weight of nitrocellulose.

Example 3

10 parts by weight of furylethylene, 10 parts by weight of toluol, and 0.01 part by weight of benzoyl peroxide were heated in a pressure tube at 200–210° C. for 14 hours. A gelatinous mass was formed which was dispersed by adding butyl acetate. The final composition contained 22% solids and had a viscosity of A (Gardner-Holdt scale). Films from the solution air dried tack free in 3 hours and hard in 24 hours. Films force dried for 3 hours at 71° C. were very hard and had excellent water resistance. Soaking for 60 hours in water produced no softening or whitening of the film.

Example 4

10 parts by weight of furylethylene, 10 parts by weight of toluol, and 0.2 part by weight of glacial acetic acid were heated under pressure at 200–210° C. for 7 hours. A red resinous mass was formed which was soluble in a mixture of toluol.

Example 5

10 parts by weight of furylethylene and 0.5 part by weight of blown linseed oil were heated in a pressure tube for 8 hours at 180–190° C. A viscous syrup soluble in toluol was obtained. A 50% solution of this polymer in toluol treated with 0.01 part by weight of cobalt linoleate gave a film which set up tack free in 6 hours and hard in 24 hours.

Although the above examples are limited to the use of benzoyl peroxide, furylacrylic acid, glacial acetic acid and blown linseed oil, to effect the polymerization, other materials, such as linseed oil acids, China wood oil, caproic acid, benzoic acid, potassium perchlorate, hydrogen peroxide, ozone, other drying oils and their acids, and semi-drying oils, may be used.

Furthermore, although I prefer to utilize temperatures from 180–210° C. and to heat for from 6–14 hours, I desire to have it understood that the polymerization may be carried out at other temperatures and for other periods of heating than those mentioned in the above examples. I may also vary the quantity of catalyst or oil used, but if the quantities of these polymerizing materials are increased materially the time of heating or the temperature used should be decreased accordingly. For instance the composition indicated in Example 2, diluted with an equal quantity of toluol, may be heated for not to exceed 24 hours at 210° C. and the composition of Example 3 may be heated under the conditions indicated therein with .04 part by weight of benzoyl peroxide, without forming an undesirable amount of insoluble polymer. Likewise the polymerization may be conducted for longer periods at lower temperatures or when a solvent is present, or for shorter periods at slightly higher temperatures than those indicated and still obtain satisfactory results.

Where the time of polymerization is not a controlling factor, this may be effected by the use of ultra-violet light, but the polymerization of furylethylene proceeds so slowly under these circumstances that I prefer to use the other methods of inducing polymerization indicated herein.

Although polymerized furylethylene may be used to form coating compositions as indicated above, it may also be combined with the usual film-forming ingredients as indicated in the following examples:

Example 6

| | Parts by weight |
|---|---|
| Polymer, made as in Example 1 | 10 |
| Nitrocellulose (½" viscosity) | 30 |
| Toluol | 10 |
| Butyl acetate | 60 |
| Ethyl acetate | 45 |
| Ethyl alcohol | 5 |
| Total | 160 |

Example 7

| | Parts by weight |
|---|---|
| Polymer in toluol solution, made as in Example 3 | 10.0 |
| Lindol | 0.4 |
| Total | 10.4 |

Example 8

| | Parts by weight |
|---|---|
| Polymer, made as in Example 1 | 10 |
| Nitrocellulose (½" viscosity) | 30 |
| Toluol | 10 |
| Butyl acetate | 60 |
| Ethyl acetate | 45 |
| Ethyl acohol | 5 |
| Lindol | 2 |
| Total | 162 |

Other driers, such as lead and manganese driers, may be used in place of cobalt linoleate, and these driers may be used in coating compositions of the type indicated herein where desired. Likewise pigments may be added in the usual way to coating compositions containing polymerized furylethylene.

It is a particular point of my invention that by the methods set forth herein I obtain polymers which are soluble in the ordinary lacquer and varnish solvents, whereas polymers of furylethylene formed by several weeks' standing exposed to air are insoluble in these materials.

It will therefore be apparent that I have developed a new method of making synthetic resins, new synthetic resins and new and improved coating compositions containing these resins, and that the rsulting resins are compatible with the usual film-forming ingredients to form coating compositions which dry quickly to form hard films that have good water resistance.

As many apparently widely different embodiments of this invention may be made without departing from the spirit and scope thereof, it is to be understood that I do not limit myself to the specific embodiments thereof except as defined in the appended patent claims.

I claim:

1. The method of polymerizing furylethylene which comprises heating it in the presence of a polymerization catalyst and discontinuing the heating before the polymer thus produced becomes insoluble in toluol.

2. The method of polymerizing furylethylene which comprises heating it in the presence of a fatty oil selected from the class consisting of drying and semi-drying oils.

In testimony whereof, I affix my signature.

BEN E. SORENSON.